United States Patent [19]

Tabalba et al.

[11] Patent Number: 4,913,511

[45] Date of Patent: Apr. 3, 1990

[54] TRANSIENT VOLTAGE SUPPRESSION FOR ELECTRO-OPTIC MODULES

[75] Inventors: Camilo M. Tabalba, Kanata; Paul J. Koens, Ashton; Joseph J. Lommen, Nepean, all of Canada

[73] Assignee: Northern Telecom Limited, Montreal, Canada

[21] Appl. No.: 330,743

[22] Filed: Mar. 30, 1989

[51] Int. Cl.[4] .................... G02B 6/36

[52] U.S. Cl. .................... 350/96.20; 250/227.24

[58] Field of Search .................... 350/96.15, 96.16, 96.18, 350/96.19, 96.20, 96.21; 250/227, 551

[56] References Cited

U.S. PATENT DOCUMENTS

| | | | |
|---|---|---|---|
| 4,255,015 | 3/1981 | Adams et al. | 350/96.20 |
| 4,427,879 | 1/1984 | Becher et al. | 350/96.20 X |
| 4,596,048 | 6/1986 | Dunki-Jacobs | 250/551 X |
| 4,639,077 | 1/1987 | Dobler | 350/96.20 |
| 4,767,179 | 8/1988 | Sampson et al. | 350/96.20 |

*Primary Examiner*—Frank Gonzalez
*Assistant Examiner*—Akm E. Ullah
*Attorney, Agent, or Firm*—Jean-Pierre Fortin

[57] ABSTRACT

An improved electro-optic module able to sustain high voltage transients is disclosed. The module is able to eliminate unwanted signals by providing a discharge path for high voltage transients, away from the electronic and opto-devices. The module is comprised of an optical connector having a connecting end adapted to receive and secure an optical fiber cable, a circuit board attached to the optical connector and which is electrically isolated therefrom and means for isolating the circuit board from the connecting end of the optical connector.

11 Claims, 4 Drawing Sheets

TRANSIENT VOLTAGE SUPPRESSION FOR ELECTRO-OPTIC MODULES

FIELD OF THE INVENTION

This invention relates to fiber optic modules for fiber optic links used to connect various system elements in a telephone switching system.

BACKGROUND OF THE INVENTION

In a telephone switching system using fiber optic links between various system elements, electro-optic transmitter and receiver modules are used to terminate each end of the optical link. Each serve as the electronic/optical interfaces between the equipment and the fiber. Electronic equipment must be protected from electro-static voltage (ESD), or transient voltages which it may be exposed to, by adjacent equipment, or craftsperson servicing the equipment. Such destructive voltages may be in the range of a few hundred volts to thousands of volts.

Because total protection from ESD is very difficult, separation of the electronic ground return path became a common practice. Any hits from ESD may then be conducted on metallic surfaces to the frame ground, which is in turn solidly connected to the regulatory building ground. Although optical signals are not affected by ESD, the electrical components can be.

Physically, the modules are located on a circuit card which is attached to one side of the backplane. In some instances, up to twelve modules including associated clock recovery circuits are located on such a card. Because of the small size of the card, which can be (10.5×3.5) inch, and the need to locate the modules close to the faceplate to make the optical receptacle accessible, small module size is required. In addition, the module should be able to relieve strain to the hybrid from forces associated with the fiber optic connector and cable, provide general mechanical protection, EMI shielding with grounding, heat transfer away from electronic components, and provide minimal resistance to the general flow of cooling air over the PCB.

Although electro-optic modules of small size already exist, these have an optical connector with a metallic liner or shell to provide increased rigidity. Even with the connector grounded to the equipment ground, it was found that unwanted signals and high voltage transients were affecting the operation of the internal components of the module, and other electronic circuits on the circuit card.

There is accordingly a need for an improved electro-optic module able to sustain high voltage transients, able to eliminate unwanted signals while retaining its small size and rigidity as well as meeting the above requirements.

SUMMARY OF THE INVENTION

It is therefore an object of the present invention to provide an improved electro-optic module and grounding scheme which will provide a discharge path for high voltage transients, away from the module containing the electronic and opto-devices, while meeting the above design requirements.

According to a first embodiment of the invention, there is provided, an electro-optic module for connecting to an optical fiber and which is comprised of an optical connector having a connecting end adapted to receive and secure an optical fiber cable, a circuit board attached to the optical connector and which is electrically isolated therefrom and means for isolating the circuit board from the connecting end of the optical connector.

According to a second embodiment of the invention, there is provided, an electro-optic module for connecting to an optical fiber and which is comprised of an optical connector having a connecting end adapted to receive and secure an optical fiber cable, a circuit board attached to the optical connector and which is electrically isolated therefrom, and a conductive outer shell disposed around the optical connector and extending from the connecting end to a point along the connector, which is disposed away from the circuit board, such that the conductive outer shell provides a discharge path for voltage transients.

According to a third embodiment of the invention, there is provided, an electro-optic module for connecting to an optical fiber and which is comprised of a circuit board having electro-optic devices thereon, an optical connector with a first portion having an outer shell with an optical fiber receptacle disposed centrally thereof, the portion having means for receiving and securing the optical fiber, a second portion for attaching to the circuit board and an isolator separating the first portion from the second portion to isolate the circuit board from the first portion, such that high voltage transients are directed away from the circuit board.

BRIEF DESCRIPTION OF THE DRAWINGS

Preferred embodiments of the invention will now be described in conjunction with the accompanying drawings in which.

DESCRIPTION OF THE PREFERRED EMBODIMENT

Figure 1B:
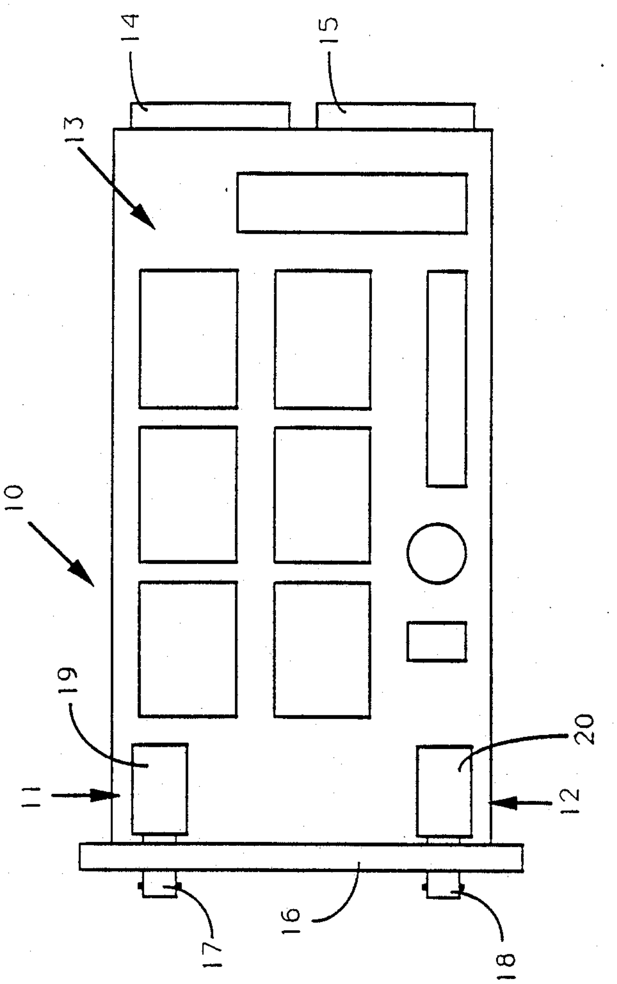
FIGS. 1*a* and 1*b* are front and side views of a typical card showing the placement of electro-optic connectors.
Figure 1A:
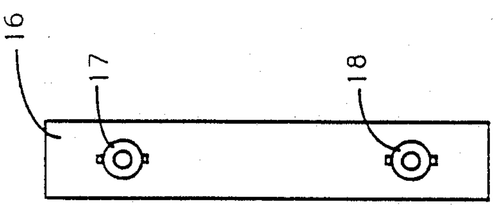
Figure 2A:
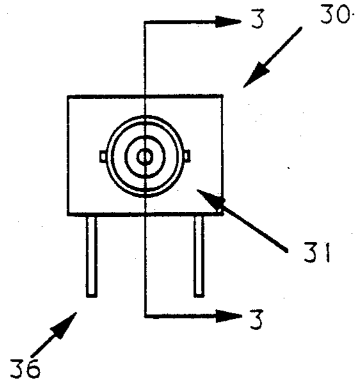
FIGS. 2*a* and 2*b* are front and side views of an electro-optic module according to a first embodiment of the invention.
Figure 2B:
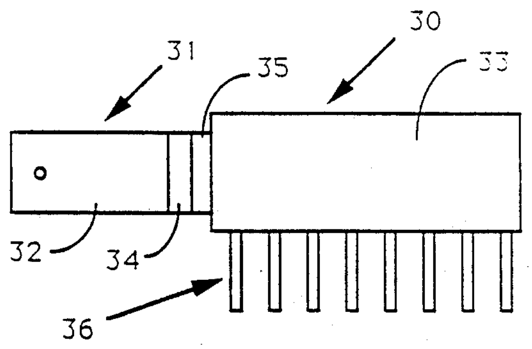

Referring now to FIGS. 1*a* and 1*b*, we have shown a front and side view of a typical connecting card 10 used on backplanes of telephone switching systems. As indicated above, advanced telephone switches now make use of electro-optic modules 11 and 12 to send and receive high speed information. For example, module 11 could be used as a receiving module, whereas module 12 could be used as a transmitting module. Card 10 supports various electronic components 13 and is connected to the backplane of the switch using multi-pin connectors 14 and 15. A face plate 16 separates the optical connectors 17 and 18 of modules 11 and 12 from the modules' enclosures 19 and 20 and from the other electronic components 13. Optical fibers can be connected to modules 11 and 12 using the necessary optical connectors adapted to match connectors 17 and 18.

In FIGS. *2a* and *2b*, we have shown a front and side view of an electro-optic module according to a first embodiment of the invention. The module 30 is comprised of an optical connector 31 having a first portion 32 used as a connecting end and which is adapted to receive and secure an optical fiber cable and an enclosure 33 containing a circuit board with various electro-optic components. Enclosure 33 can be a conventional housing for electronic components. It is however, not required for the purpose of transient suppression, but is normally used to shield the electronic and optical devices from electromagnetic interference, or to reduce electromagnetic radiation. The enclosure 33 is attached to the optical connector 31, but is electrically isolated therefrom by means of an isolator 34 separating the first portion 32 of the connector 31 from a second portion 35 attached to the enclosure 33. A series of connecting pins 36 are used to secure and electrically connect the circuit board and module 30 to the support card shown in FIG. 1.

Figure 3:
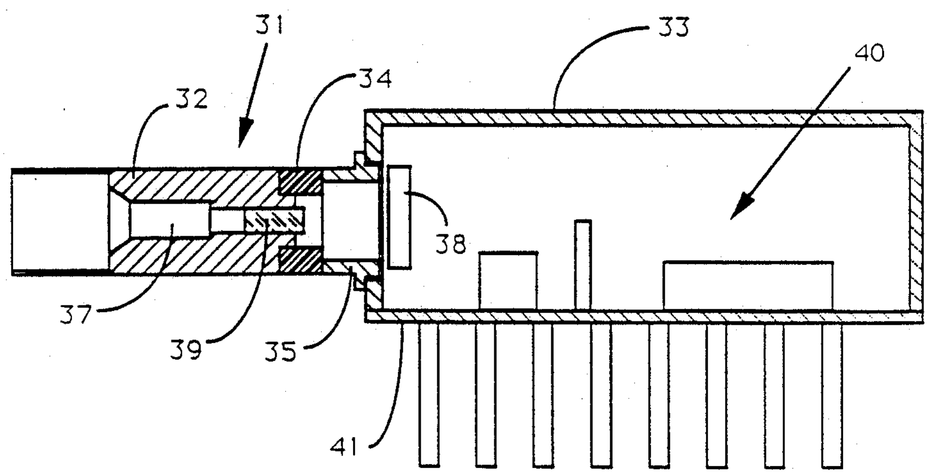
FIG. 3 is a sectional view taken along lines 3—3 of FIG. 2*a*.

FIG. 3 is a sectional view of the electro-optic module of FIG. *2a*. As seen in FIG. 3, the first portion 32 of connector 31, is isolated from the second portion 35 and enclosure 33 by means of a ring-shaped isolator 34. The ring-shaped isolator allows light travelling through optical channel 37 to reach electro-optic transducer 38. Light may be focused on the transducer 38 by suitable means, such as a GRIN (graded index) lens 39 or equivalent. The electro-optic transducer 38 may contain an LED or LASER diode, or it may have an optical detector. Various electro-optic components 40 are supported on circuit board 41 and attached to the connector 31 via the second portion 35, thereby isolating the electro-optic components from high voltage transients, which may affect these as well as other electronic components on the card. However, the optical channel 37 is not affected by transient voltages, electromagnetic interference or radiation.

Figure 4:
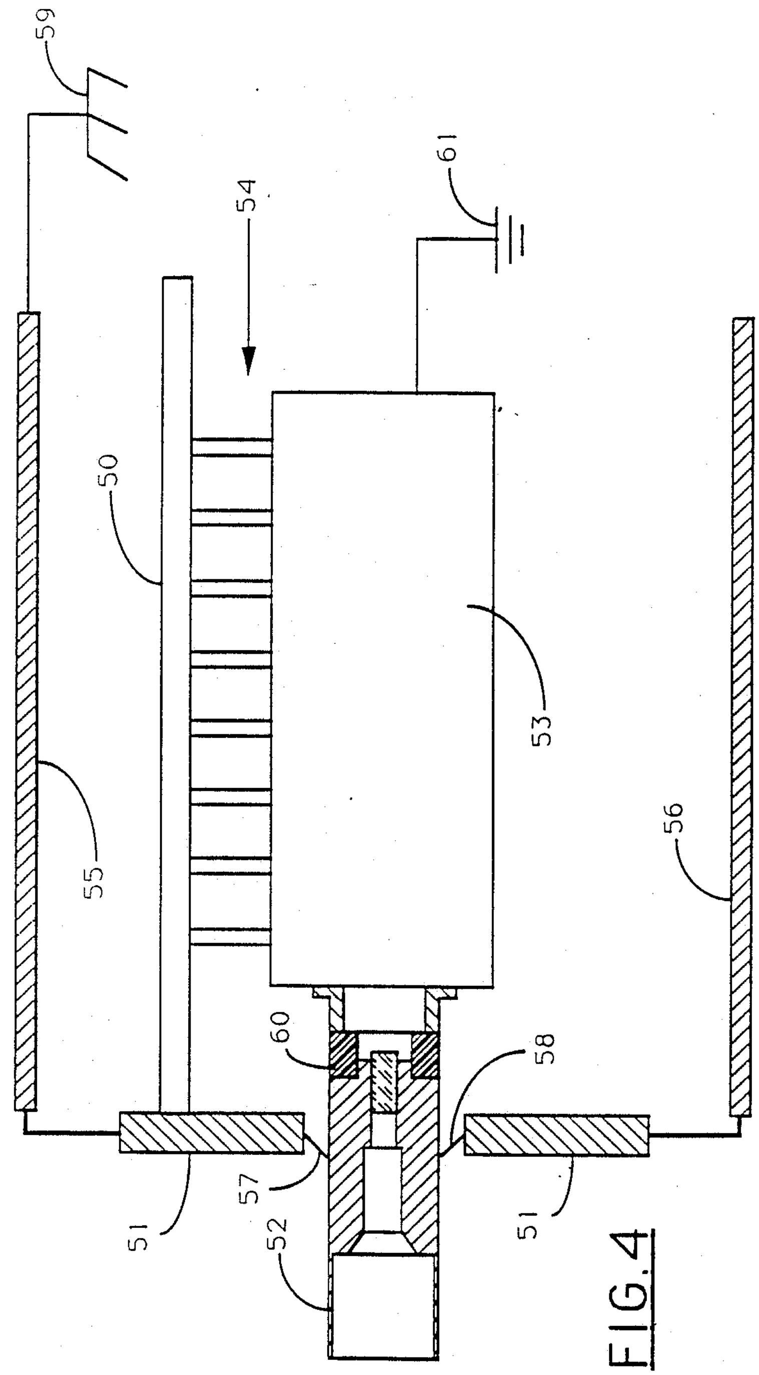
FIG. 4 is a diagrammatical representation of the discharge path taken by high voltage transients with the module of FIG. 3.
Figure 5:
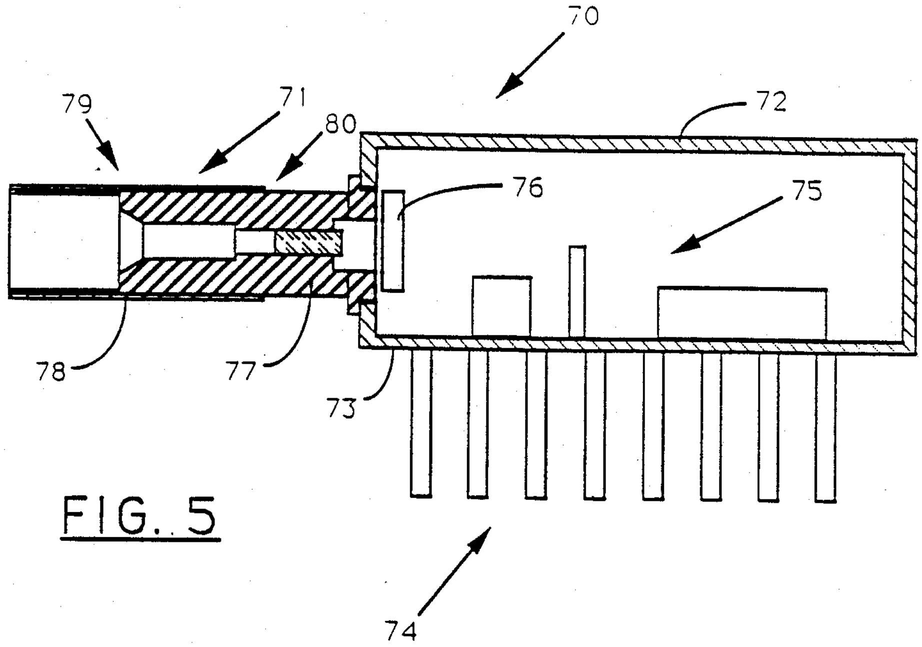
FIG. 5 is a sectional view of an electro-optic module according to a second embodiment of the invention.

FIG. 4 is a grounding scheme representation using the electro-optic module of the present invention. In a typical telephone switch, a plurality of cards are placed side by side on a mounting rack to form a series of shelves. When placed on the shelves, the cards are slid into individual slots to become connected to the backplane. FIGS. 4 and 5 are simple representations of the grounding scheme used with the electro-optic module embodiments of FIGS. 3 and 5. In the embodiment of FIG. 4, reference numeral 50 represents the removable card, having face plate 51. The face plate is conventionally present in equipment design practice. The plate 51 has a conductive surface, if it is not made of metal. The electro-optic module has its optical connector 52 extending therethrough. The enclosure 53 is secured to card 50 and electrically connected thereto by means of pins 54. The frame of the telephone switch is represented by side walls 55 and 56 which are connected to an earth ground 59. If a high voltage transient is carried along the metallic liner of the optic fiber, it will be discharged via a physical conductive path 57 or 58 to the equipment frame 55 or 56 and eventually to the earth ground 59. Isolator 60 isolates the circuit card from any harmful effects of the transient voltages, without affecting the operation of the electro-optic module and its components. A power supply or logic ground 61 is provided for the circuit board and the electro-optic components. The practice of using an earth ground separated from a logic ground eliminates the effects of unwanted frame ground induced currents from affecting the supply ground and electro-optic components.

FIG. 5 is a sectional view of an electro-optic module according to a second embodiment of the invention. As seen in FIG. 5, the module 70 is also comprised of an optical connector 71 and an enclosure 72 disposed over a circuit board 73 having connecting pins 74. Various electro-optic components 75 are used to convert optical energy to electrical energy, or vice-versa with transducer 76. However, in this embodiment, the optical connector 71 is comprised of a single connecting element 77 made of nonconductive material. A discharge path away from the enclosure 72 and circuit board 73 is provided by means of a conductive outer shell or liner 78 disposed around the connecting element 77. The liner extends from the connecting end 79 to a point 80 along the connector away from the enclosure 72 and circuit board 73. Accordingly, the enclosure 72 and circuit board 73 are isolated from the connector by the gap created between the liner 78 and the edge of the enclosure.

Figure 6:
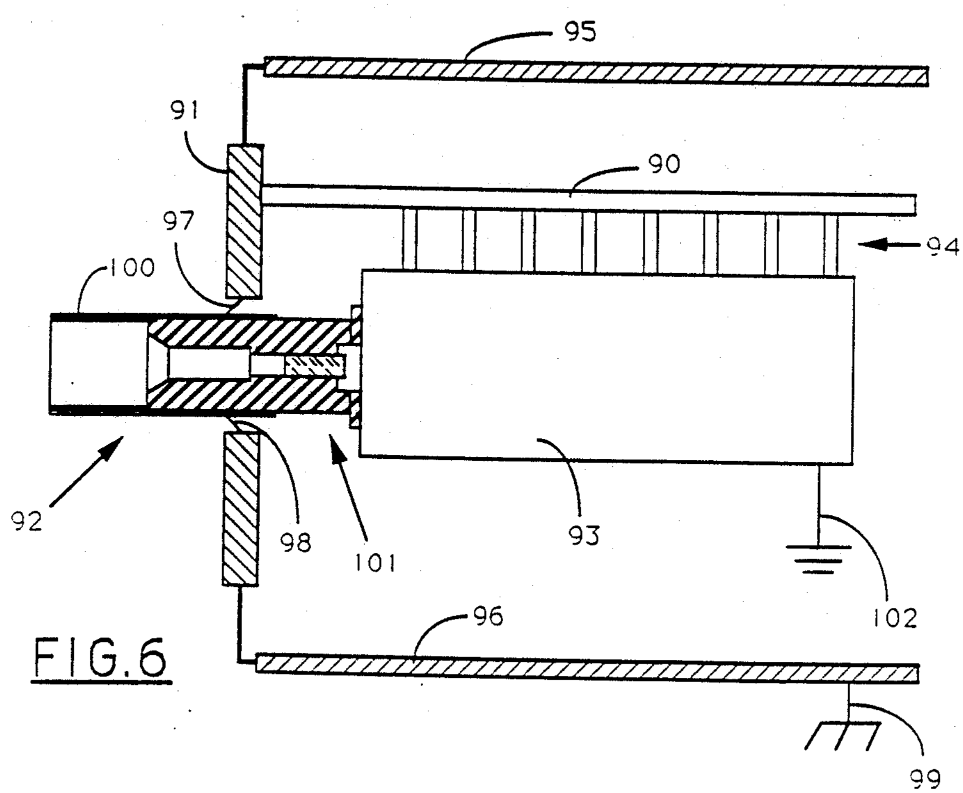
FIG. 6 is a diagrammatical representation of the discharge path taken by high voltage transients with the module of FIG. 5.

FIG. 6 is a grounding scheme representation using the electro-optic module of FIG. 5. Similarly, as with the grounding scheme arrangement of FIG. 4, the physical juxtaposition of elements is the same. That is, reference numeral 90 represents the removable card, having face plate 91. The electro-optic module has its optical connector 92 extending therethrough. The enclosure 93 is secured to card 90 and electrically connected thereto by means of pins 94. The frame of the telephone switch is represented by side walls 95 and 96 which are connected to an earth ground 99. However, in this embodiment, if a high voltage transient or unwanted signal is carried along the metallic liner of the optic fiber, it will be discharged via the metallic liner 100 of connector 92 through physical conductive path 97 or 98 to the equipment frame 95 or 96 and eventually to the earth ground 99. The gap 101 created between liner 100 and enclosure 93 will isolate the circuit card from any damaging effects unwanted signals might have on the module, when carried along the fiber. A power supply or logic ground 102 is provided for the circuit board and the electro-optic components. This practice eliminates the effect of unwanted frame ground induced currents from affecting the supply ground and electro-optic components.

What is claimed is:

1. An electro-optic module for connecting to an optical fiber, comprising:

an optical connector having a first portion used as a connecting end for receiving and securing said optical fiber;

a circuit board attached to said optical connector at a second portion thereof; and isolating means at said optical connector, adapted to electrically isolate said connecting end of said first portion from said second portion, such that high voltage transients are directed away from said circuit board.

2. An electro-optic module as defined in claim 1, wherein said isolating means comprises a conductive outer shell disposed around said connecting end and extending along said first portion to a point near said second portion, spaced from said circuit board to isolate said circuit board from said connecting end, said conductive outer shell providing a discharge path for voltage transients.

3. An electro-optic module as defined in claim 2, wherein said second portion is made of non-conductive material.

4. An electro-optic module as defined in claim 1, wherein said isolating means comprises an isolator separating said connecting end of said first portion from said second portion to isolate said circuit board from said connecting end.

5. An electro-optic module as defined in claim 4, wherein said isolator is ring-shaped.

6. An electro-optic module as defined in claim 5, wherein said isolator is made of ceramic material.

7. An electro-optic module for connecting to an optical fiber, comprising:
- an optical connector having a connecting end adapted to receive and secure an optical fiber cable;
- a circuit board attached to said optical connector and electrically isolated therefrom; and
- a conductive outer shell disposed around said optical connector and extending from said connecting end to a point along said connector, which is disposed away from said circuit board, such that said conductive outer shell provides a discharge path for voltage transients.

8. An electro-optic module as defined in claim 7, wherein said outer shell is made of conductive material.

9. An electro-optic module for connecting to an optical fiber, comprising:
- a circuit board supporting electro-optic devices;
- an optical connector with a first portion having an outer shell with an optical fiber receptacle disposed centrally thereof, said portion having means for receiving and securing said optical fiber;
- a second portion for connecting to said circuit board; and
- an isolator separating said first portion from said second portion to isolate said circuit board from said first portion, such that high voltage transients are directed away from said circuit board.

10. An electro-optic module as defined in claim 9, wherein said isolator is ring-shaped.

11. An electro-optic module as defined in claim 10, wherein said isolator is made of ceramic material.

* * * * *